United States Patent [19]

Bailey et al.

[11] 3,757,644

[45] Sept. 11, 1973

[54] FLOW CONTROLLED CONTROL SYSTEM FOR MOTORS

[75] Inventors: Keith A. Bailey, Speedway; Jerry R. Marlow, Greenwood, both of Ind.

[73] Assignee: General Motors Corporation, Detroit, Mich.

[22] Filed: June 5, 1972

[21] Appl. No.: 259,464

Related U.S. Application Data

[62] Division of Ser. No. 21,950, March 23, 1970, Pat. No. 3,682,043.

[52] U.S. Cl.................. 91/411 R, 91/413, 192/3.3, 192/3.57, 60/325, 91/471
[51] Int. Cl............................................. F15b 11/16
[58] Field of Search................... 91/411 R, 412, 413

[56] References Cited
UNITED STATES PATENTS

| | | | |
|---|---|---|---|
| 3,128,642 | 4/1964 | Fisher et al...................... | 74/752 AI |
| 3,338,256 | 8/1967 | Panissidi......................... | 137/497 X |
| 3,618,727 | 11/1971 | Cornet................................ | 91/412 |

*Primary Examiner*—Edgar W. Geoghegan
*Attorney*—W. E. Finken et al.

[57] ABSTRACT

A flow controlled motor control system used to control a transmission torque converter lockup clutch in response to fluid motor operation to establish the transmission ratio drives. The controls have a shift motor system including a shift valve selectively supplying each fluid motor with shift apply and leakage make-up flow to establish and maintain a selected ratio drive, a lockup clutch valve to engage the lockup clutch and a flow valve tripped by a fast change in flow rate on initiating shift flow to disengage the lockup clutch and permitting slow changes in the leakage flow rate without tripping. These flows pass through a restriction providing a differential pressure which selectively actuates a trip control and the response control of the flow valve. The slowly increasing leakage flow rate actuates the response control which increases the size of the restriction or the return biasing force to permit slowly increased leakage flow without actuating the tripping control to trip the flow valve. The response control is unresponsive to the rapid increase of the shift flow rate which only actuates the tripping control to trip the flow valve.

8 Claims, 7 Drawing Figures

United States Patent
Bailey et al.
[11] 3,757,644
[45] Sept. 11, 1973
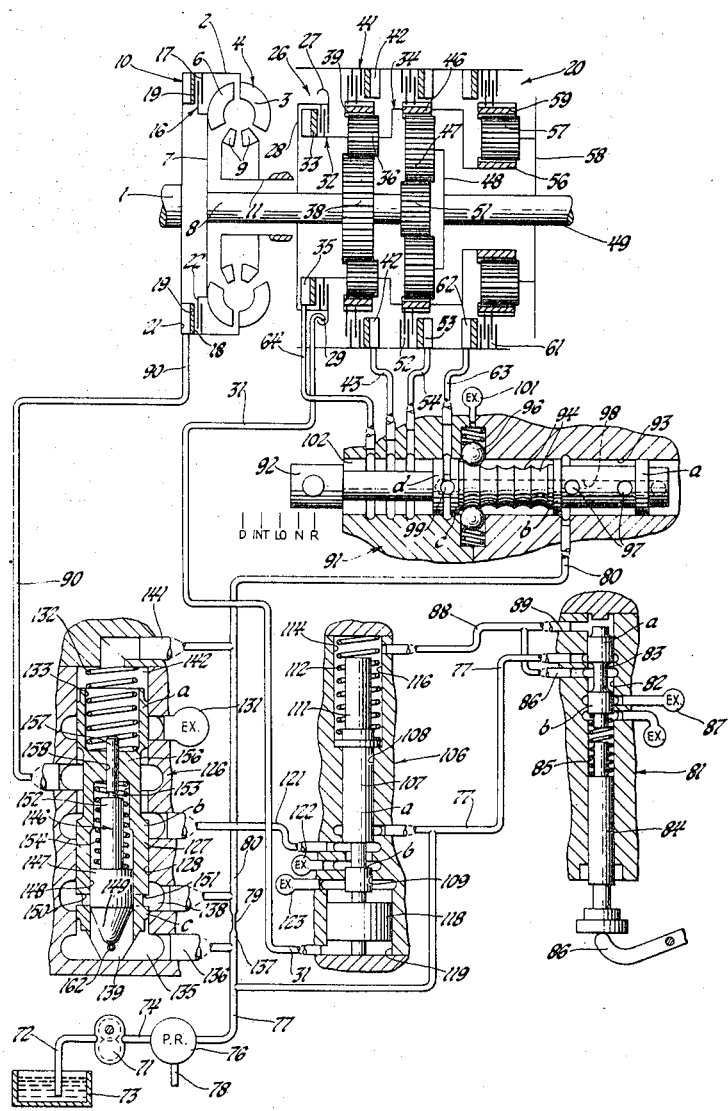

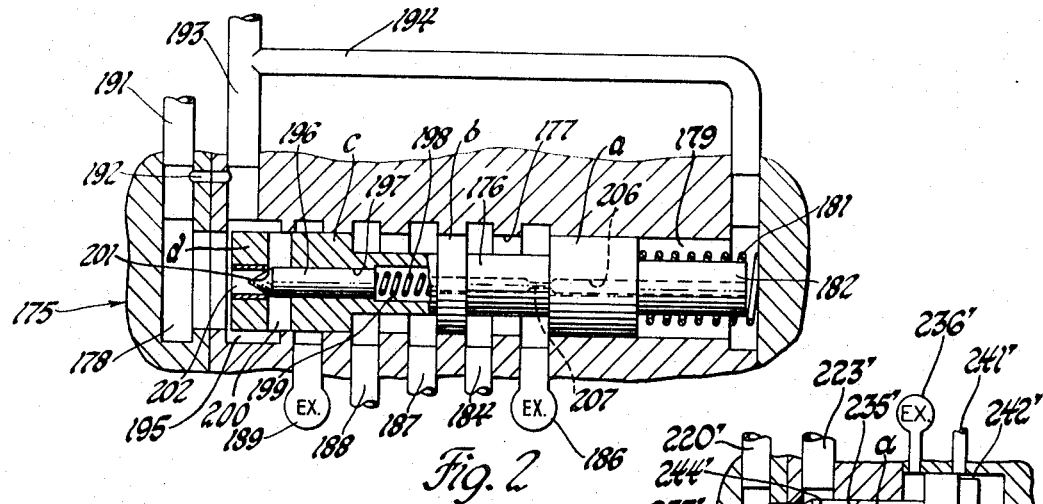
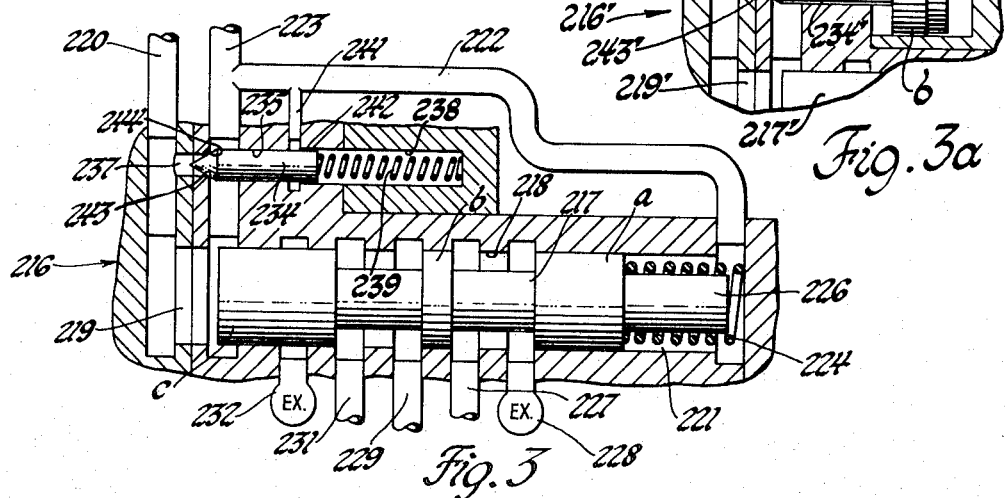
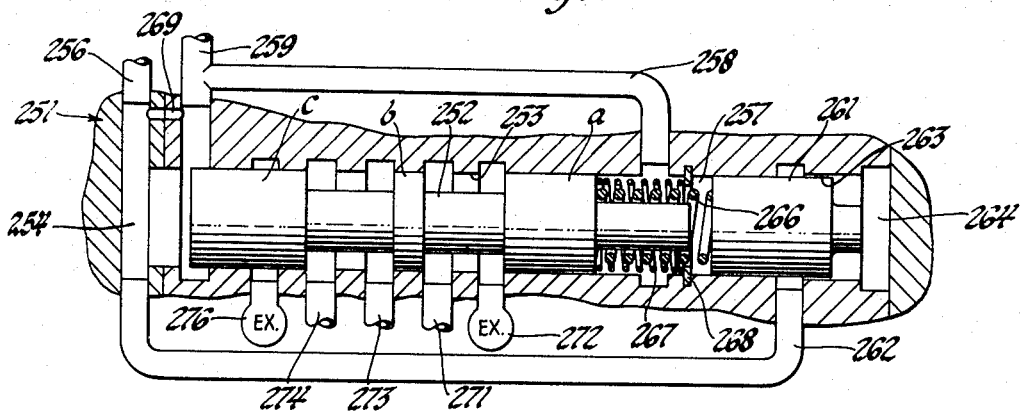

FLOW CONTROLLED CONTROL SYSTEM FOR MOTORS

This invention relates to flow responsive controls for motors and such controls selectively responsive to different changes in flow and is a division of our U.S. patent application Ser. No. 21,950 filed Mar. 23, 1970, now U.S. Pat. No. 3,682,043.

SUMMARY OF THE INVENTION

The invention provides an improved flow responsive control for motors which may be used in power shift transmissions having a torque converter with a lockup clutch which is disengaged during a change in drive ratio. This control is also useful in transmissions having a multi-ratio gear unit and another device such as an input clutch or throttle reduction control which is actuated in response to a shift change. In transmissions a lockup clutch valve controls the supply of fluid from a source to the lockup clutch motor to selectively engage the lockup clutch and a manually or automatically controlled shift valve controls the supply of fluid from a source to one or more operated devices such as ratio engaging motors to selectively establish a plurality of drive ratios. During the shift change for engagement of a drive ratio the rapidly increased flow of fluid from the source to the ratio engaging device is directed through a restriction to provide a pressure differential to actuate or trip a cut-off or flow responsive valve to control the supply of fluid to the lockup clutch to disengage the lockup clutch during the shift for engagement of a ratio. When the shift change is completed, the shift change flow ceases and the flow responsive valve is reset to the untripped condition. The flow responsive valve will not trip in response to slower increases in the flow rate in the operating range. The flow valve trips in response to a predetermined pressure differential due to rapidly increased flow in a short period of time, a high rate of change of flow rate through a restriction between a source of fluid pressure and the shift control system or work system which includes the shift valve and the shift motors or operated devices. Each ratio drive motor is maintained established by leakage flow through the restriction to the shift system to make up system leakage and maintain or keep the fluid motor establishing the drive filled under pressure. Leakage flow, the normal flow to maintain a system condition, has a slow rate of change of flow rate with variations in wear and temperature. When leakage flow increases at a slow rate of change of flow rate it provides a slow increase in differential pressure which actuates a response control that after a time delay increases the size of the restriction so the differential pressure increases at a low linear rate with increasing flow rate or increases the return biasing force with differential pressure. The change of flow rate from the leakage flow rate to the shift change or operating flow rate has such a high rate of change of flow rate and the shift change is completed in such a short time period that the delayed response control does not significantly change the size of the restriction or return bias force so the differential pressure increases at a high parabolic rate relative to increasing flow rate to trip the flow valve and provide a controlled device, lockup clutch, disengaging signal. Since this signal indicates the presence of operating flow it is also called an operating signal and the signal before the valve trips indicating the absence of operating flow is an inoperating signal.

One type of flow or cut-off valve trips from the lockup supply position to the lockup cut-off position in response to a rapid increase in the flow rate occurring over a small time period flowing through a restriction to cause a high predetermined pressure differential but will accommodate even larger slow increases in the flow rate occurring and existing over a longer period of time and only cause a lower pressure differential insufficient to trip the flow valve. Fluid supply to apply a motor causes a rapid increase in the flow rate and gradually increased leakage in the shift control system slowly increases the flow rate with changes in operating conditions, wear and temperature, over the life of the transmission. The small time period required for tripping the flow valve in response to shift flow is less than that required to take up the slack in any ratio being engaged so that the flow valve trips to disengage the lockup clutch before torque transmittal in the new ratio is initiated and maintains it disengaged during the completion of the engagement of the new ratio. Gradual slow increases in the flow rate across the restriction caused by leakage are accommodated by a response control, a time delayed variable restriction control valve, which will function, when there is an increased flow for a period longer than that required for a complete ratio change, to increase the size of the restriction so that the increased flow is accommodated with a lower and linear rate of increase of pressure differential with increasing leakage flow. A slow increase in flow rate larger than the rapid increase in flow rate for ratio change may be accommodated without providing the predetermined pressure differential which trips the flow valve. Thus the flow valve will remain in the open position over a wide range of gradually changing leakage flow values but will operate from any of these flow values in response to a smaller rapid change in flow value caused by a shift change to trip the flow valve to close, providing a signal to disengage the lockup clutch. The restriction has a primary or initial calibrated restriction and increases in size or has a secondary variable restriction in parallel increasing the size of the initial restriction in accordance with slowly increasing flow existing for a period of time longer than the shift change period to gradually increase the size of the restriction. Thus the rate of increase of pressure differential with slowly increasing flow rate existing longer than the shift cycle period due to the increasing size of the restriction is linear and thus reduced as compared to the parabolic rate of increase of differential pressure with a rapidly increasing flow rate existing for a shorter period due to the constant size restriction.

In another flow valve the return bias force is gradually increased with slowly increasing leakage flow to increase the pressure differential required to trip the flow valve with gradually increased flow. A sudden or fast change in flow rate during a shift change will not change the bias force and will trip the flow valve.

These and other features of the invention will be more apparent from the following description.

DESCRIPTION OF THE DRAWINGS

FIG. 2 shows a modified flow controlled cut-off valve.

FIG. 3 shows anothr modified flow controlled cut-off valve.

FIG. 3a shows a modification of FIG. 3.

FIG. 4 shows another modified flow controlled cut-off valve.

DETAILED DESCRIPTION OF THE INVENTION

Figure 1:
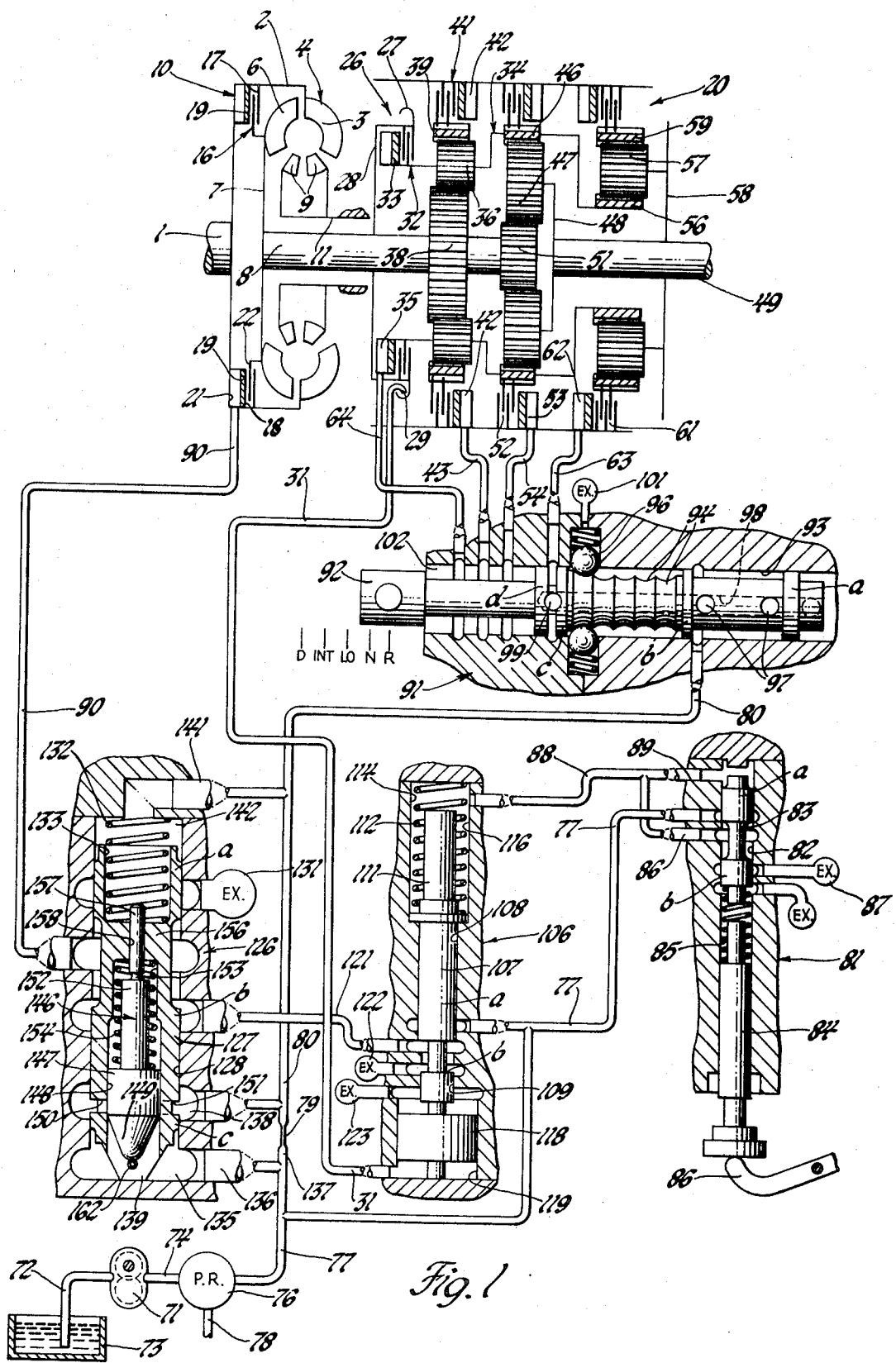
FIG. 1 schematically shows the transmission and control system including the flow controlled cut-off valve.
Figure 5:
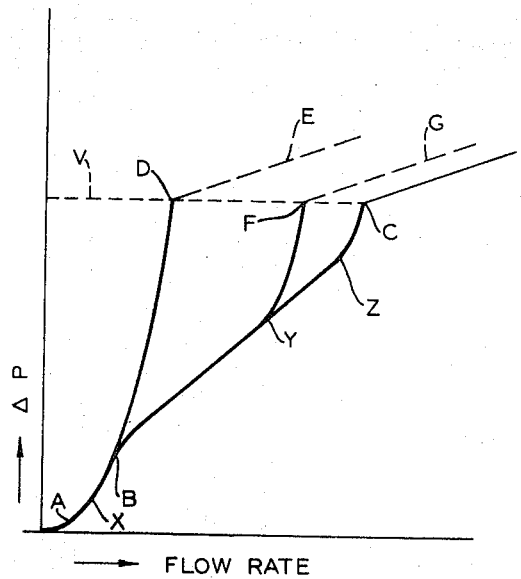
FIG. 5 shows curves illustrating the relation of the flow rate and the pressure differential in the flow valves shown in FIGS. 1 to 3.
Figure 6:
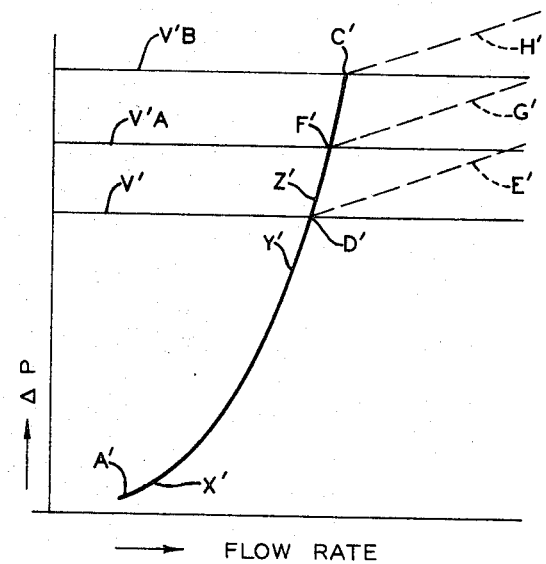
FIG. 6 shows curves illustrating the relation of the flow rate and the pressure differential in the flow valve of FIG. 4.

The Figures illustrate the flow controlled control system for motors used in a transmission control claimed herein.

For a complete description of our invention as claimed herein, reference is made to our U.S. patent application Ser. No. 21,950 for Flow Control System filed Mar. 23, 1970, now U.S. Pat. No. 3,682,043 granted Aug. 8, 1972.

Reference is made to the entire specification and drawings of Ser. No. 21,950 all of which constitute a disclosure of the invention claimed herein. The disclosure of Ser. No. 21,950 is incorporated herein by reference and made a part hereof as if fully described herein.

The above described modifications will make it apparent that other modifications may be made.

It is claimed:

1. In a control system; a passage having different fluid flows, a normal fluid flow at normal flow rates slowly variable through a large range of flow rates during long periods of time and at times an operating flow rapidly varied by a value smaller than said range of flow rates from any of said normal flow rates in said large range of flow rates to a higher operating flow rate existing only for a short operating period of time flowing from a source to an operated device line; flow responsive means operatively connected to said passage, having signal control means operatively connected to and controlled by the flow responsive means, responsive to said operating flow throughout said range of flow rates to provide an operating control signal indicating the presence of operating flow and unresponsive to said normal flow throughout said range of flow rates to provide an inoperating control signal indicating the absence of operating flow; automatic flow response varying means operatively connected to said flow responsive means and being unresponsive to said rapidly varied operating flow and responsive to only said slowly variable normal flow at all rates in said range of flow rates existing for a long period of time, longer than said short operating period of time, to control said flow responsive means when said flow responsive means is providing said inoperative control signal to prevent response of said flow responsive means to said slowly varied normal flow throughout said range of flow rates to continue to provide said inoperating control signal and to provide response to said rapidly varied operating flow from any normal flow rate by a value smaller than said range of flow rates throughout said range of flow rates to provide said operating control signal, and said control system including a plurality of fluid operated motors each functioning in response to operating flow to initiate operation and in response to said normal flow to maintain operation, a source of fluid under pressure supplying said passage and selector valve means selectively connecting said passage to each of said motors to be operated by said operating flow and maintained operated by said normal flow.

2. In a fluid control system; actuator means actuated in response to a signal; a source of fluid under pressure; fluid motor means operable on the supply of fluid thereto to initiate and maintain operation, a flow passage connected to said source and valve means connecting said flow passage to said fluid motor means to initiate and maintain operation of said fluid motor means to initiate and maintain operation of said fluid motor means and having maintaining flow through said flow passage having a low rate of change to maintain operation of selected fluid motor means and operating flow having a high rate of change to initiate operation of selected fluid motor means and flow responsive means operative only in response to said operating flow having a high rate of change to initiate operation to provide said signal to actuate said actuator means and inoperative in response to the maintaining flow rate to maintain operation having a low rate of change but the same flow rate magnitude.

3. The invention defined in claim 2 and said operating flow existing only for a short period of time and said maintaining flow existing for longer periods of time and said flow responsive means including control means responsive to flow existing for said longer periods of time to increase the value of the flow required for said flow responsive means to provide said signal.

4. The invention defined in claim 2 and said operating flow existing only for a short period of time and said maintaining flow existing for longer periods of time and said flow responsive means including means providing a pressure differential increasing at a high rate in proportion to increasing operating flow and increasing at a low rate in proportion to maintaining flow and providing said signal at a predetermined differential pressure.

5. In a fluid control system; actuator means actuated in response to a signal; a source of fluid under pressure; motor system means having a plurality of selectively operable fluid motor means each operable on the supply of fluid thereto to initiate and maintain operation, a flow passage connected to said source; selector valve means connecting said flow passage selectively to said fluid motor means to selectively initiate and maintain operation of selected fluid motor means and having maintaining flow through said flow passage having a low rate of change to maintain operation of selected fluid motor means and operating flow having a high rate of change and existing only for a short period of time to initiate operation of selected fluid motor means and flow responsive means tripping in response to a pre-set flow rate of said operating flow having a high rate of change to initiate operation existing only for said short period of time to provide said signal to actuate said actuator means and operative in response to increasing maintaining flow existing for a longer period of time to increase said pre-set flow rate to prevent tripping in response to maintaining flow of the same magnitude.

6. The invention defined in claim 5 and said flow responsive means having a pre-set restriction means providing a differential pressure signal at said pre-set flow rate and being operative in response to increasing maintaining flow to increase the size of said pre-set restriction to provide said differential pressure at a higher flow rate to prevent tripping in response to increasing maintaining flow.

7. The invention defined in claim 5 and said flow responsive means having a pre-set force biasing means providing increased biasing force with increasing maintaining flow existing for longer periods of time to increase the operating flow required to provide said signal with increasing maintaining flow.

8. A method of controlling a system having a plurality of fluid motors selectively operable and having continued leakage make-up fluid flow at a flow rate to maintain each selected drive varying with a small rate of change increasing over a large range of flow rate values and operative throughout said range of make-up fluid flow rate values in response to shift change flow having a larger rate of increase in fluid flow rate and a smaller change in value of fluid flow rate, than said range of flow rate values of make-up flow, during an initial portion of a short shift change period and flow continuing at a high rate in a completing portion of said shift change period to establish another selected drive; the method of distinguishing between leakage flow and shift change flow of the same or greater value to provide a signal, the control step of providing an output signal in response to said smaller increase in flow rate value at said larger rate of change in the rate of flow in said initial portion of said shift change period and maintaining said output signal during the completing portion of said short shift change period, the step of providing a control modifying signal in response to said small rate of change in the rate of make-up flow during leakage flow throughout said range of make-up fluid flow values but being unresponsive to a change in the rate of flow existing only for said short shift change period, to modify the response of the first control step to flow to be unresponsive to changes in leakage flow rate having the same and greater values than said changes in flow rate during said initial portion of said shift change period so changes in leakage flow rate do not provide an output signal throughout said range of flow rate values.

* * * * *